(12) United States Patent
Pulido (10) Patent No.: US 7,417,850 B1
(45) Date of Patent: Aug. 26, 2008

(54) SELF CONTAINED POWER AND SIGNAL DISTRIBUTION SYSTEM FOR COMPUTERS AND THE LIKE

(76) Inventor: Juan Pulido, 645 G St., Ste 100-842, Anchorage, AK (US) 99501

( * ) Notice: Subject to any disclaimer, the term of this patent is extended or adjusted under 35 U.S.C. 154(b) by 229 days.

(21) Appl. No.: 11/519,599

(22) Filed: Sep. 11, 2006

(51) Int. Cl.
H05K 5/00 (2006.01)

(52) U.S. Cl. ...................................... 361/679
(58) Field of Classification Search ................. 361/602, 361/679, 683, 622, 641; 439/218
See application file for complete search history.

(56) References Cited

U.S. PATENT DOCUMENTS

| | | | | |
|---|---|---|---|---|
| 4,155,108 | A * | 5/1979 | Tuttle et al. | 361/622 |
| 5,583,764 | A * | 12/1996 | Nail et al. | 702/2 |
| 6,106,457 | A * | 8/2000 | Perkins et al. | 600/175 |
| 6,452,923 | B1 * | 9/2002 | Gerszberg et al. | 370/352 |
| 6,597,572 | B2 * | 7/2003 | Nishikawa et al. | 361/695 |
| 6,866,527 | B2 * | 3/2005 | Potega | 439/218 |
| 2005/0174723 | A1 * | 8/2005 | Chan et al. | 361/600 |
| 2006/0139861 | A1 * | 6/2006 | Krieger et al. | 361/679 |
| 2007/0006328 | A1 * | 1/2007 | Sogo | 726/34 |
| 2007/0227426 | A1 * | 10/2007 | Funayose et al. | 114/55.5 |

* cited by examiner

Primary Examiner—Chandrika Prasad
(74) Attorney, Agent, or Firm—Michael J. Tavella (57) ABSTRACT

A centralized connections unit for power and data. This device simplifies computer setup and networking by offering advanced cable management while simultaneously providing a power source with battery power backup. The unit contains everything needed to connect the computer, Internet, and peripheral devices from one portable location. Moreover, its sleek design with minimal exposed cabling makes computer setup less intrusive. The basic model includes one 'box' that encases all of the contents. To provide a power source to the computer and its devices, a retractable reel inside the box holds a solitary power extension cable. Cables are bundled together and encased in tubing to form the 'arms' of the box. A main tower arm (or artery) that connects to the computer's tower, and the desktop arm connects the computer monitors and other peripheral devices. These arms include virtually all types of cables to accommodate all different types of computers.

25 Claims, 8 Drawing Sheets

SELF CONTAINED POWER AND SIGNAL DISTRIBUTION SYSTEM FOR COMPUTERS AND THE LIKE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to self contained power and signal distribution system for computers and the like and particularly to self contained power and signal distribution system for computers and the like that are portable and can be daisy-chained.

2. Description of the Prior Art

Today, computers and other electronic equipment use electric power, and various communications lines such as telephone lines, high-speed data connections (e.g. DSL, USB and other types of systems). Computers also connect to various peripherals such as monitors, printers, scanners, personal digital assistants (PDA), keyboards and mice. Today, these connections are made using a variety of cables that often create a mess. Even with wire control ties, running many cables to the various components can be a time consuming and cumbersome problem. When multiplied by several computers (say in a new office, for example), the time spent in routing and installing all of the various cables and power can be enormous.

Power, or course, should be conditioned using at least a surge suppressor and at best an uninterruptible power supply. However, these are expensive, large and sometimes complex units to install.

The problem becomes even more complex when one is setting up a number of computers in a remote location such as a trade show or convention. In this situation, the user can only hope that there are adequate power and communications ports available.

BRIEF DESCRIPTION OF THE INVENTION

The instant invention overcomes al of these difficulties. The invention is a centralized connections unit for power and data (CCUPAD). The CCUPAD is a centralized, mobile unit for computer setup. The CCUPAD simplifies computer setup and networking by offering advanced cable management while simultaneously providing a power source with battery power backup. The unit contains everything needed to connect the computer, Internet, and peripheral devices from one portable location. Moreover, its sleek design with minimal exposed cabling makes computer setup less intrusive and more aesthetically pleasing.

A basic standard CCUPAD model includes one 'box' that encases all of the CCUPAD contents. To provide a power source to the computer and its devices, a retractable reel inside the CCUPAD holds a solitary power extension cable. This is the only cable that needs to be plugged into an external power source. It is also the only cable that will be exposed (besides a very small portion of the cabling to the tower).

The retractable power extension cord plugs into an external power source. The end of the cord inside the box is connected to a UPS (uninterrupted power source). The UPS unit prevents electrical spikes from reaching the computer or any of its devices, causing damage (AKA surge protector). The UPS has two different types of power outlets: one with battery backup (managed power) and one with only surge protection (unmanaged power). Both outlets provide surge protection, however, only the battery backup outlets provide power temporarily during power outages.

Cables are bundled together and encased in tubing to form the 'arms' of the box. These arms are separated into two basic categories: The main tower arm (or artery) that connects to the computer's tower, and the desktop arm that connects the computer monitors and other peripheral devices. These arms include virtually all types of cables to accommodate all different types of computers. They support power, video, audio, keyboard, mouse, and USB plug-n-play devices. The main tower arm includes all necessary cables used by the computer. A small portion of exposed cabling allows the user to plug the cables into the back of the tower. The desktop arm has an end that is encased into a small box. This box rests on the desk close to the computer monitor(s). The desktop arm box includes outlets for monitors and peripheral devices to receive power. USB and network ports allow for a network connection and easy access to install and remove peripheral devices.

In addition to a small, one computer CCUPAD, a larger CCUPAD is also made. This unit has greater capacity for additional monitors, computers and peripherals. It also has the capacity to "daisy-chain" additional CCUPADs through the unmanaged power circuits. Moreover, moving the CCUPAD is simple; the arms nestle neatly inside the CCUPAD box, ready to be deployed at the new location. Using such a system allows a user to set up a bank of computers at a trade show, for example, with minimal effort and no confusion. Moreover, breakdown of the exhibit is also fast and efficient. The CCUPADs can also be used to create a new computerized office space. For example, a company expanding into a new office space simply has to establish the desk locations. All computers can be supplied from a large CCUPAD that supplies a number of small CCUPADs around the office area. In a matter of a few hours, the entire office can be up and running with minimal inconvenience.

DETAILED DESCRIPTION OF THE INVENTION

Figure 1:
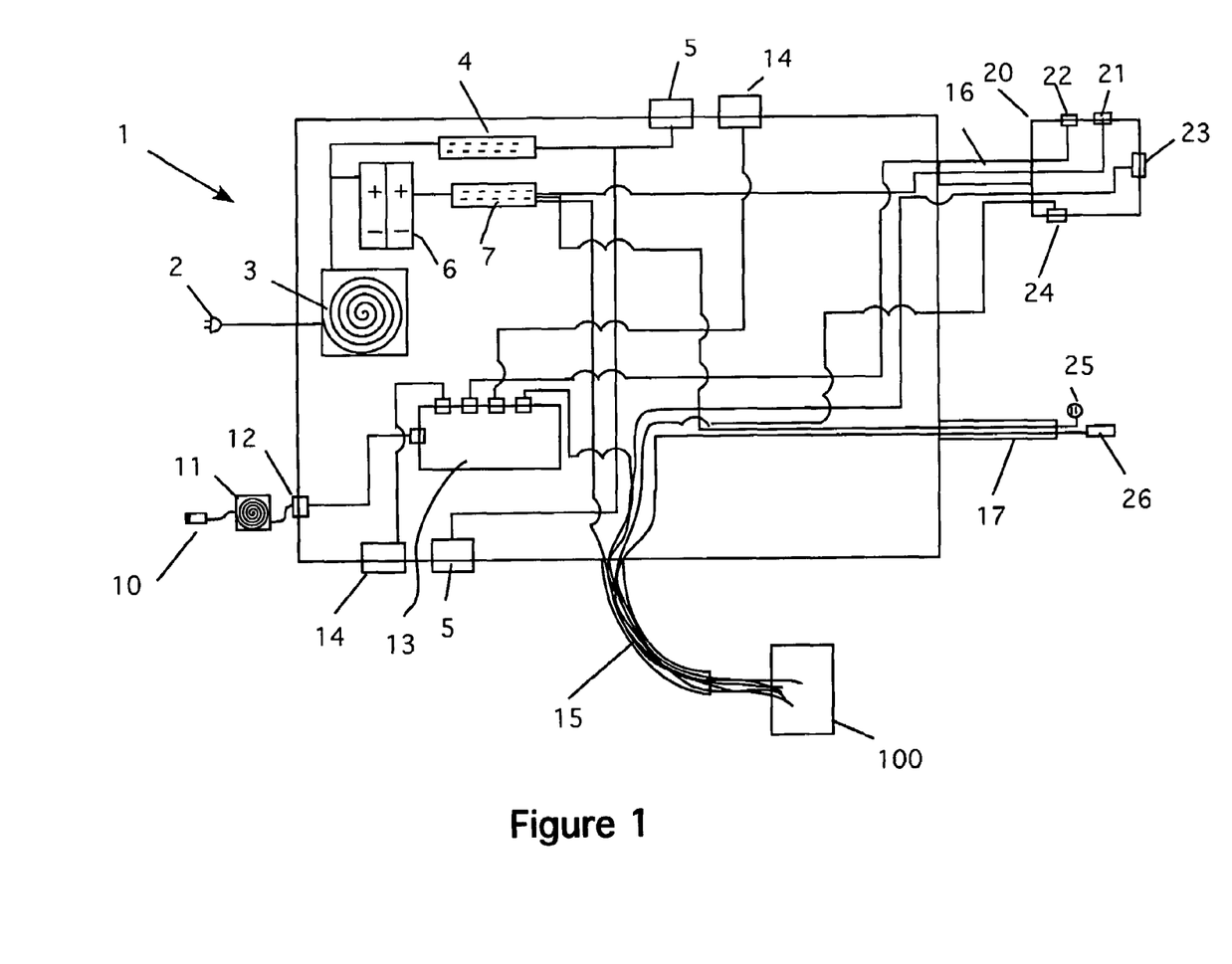
FIG. 1 is a schematic view of a small CCUPAD.

Referring now to FIG. 1, a schematic view of a small CCUPAD is shown. This CCUPAD is housed in a small toolbox type of container. It is designed to be carried by a single user to its desired location and is designed to fit under a desk for use. The schematic shown in FIG. 1 is illustrative of the configuration for the large CCUPAD as well. The difference between the two is that the large CCUPAD (as discussed below) has additional external outlets as well as a larger number of cables to permit larger installations. The small CCUPAD is designed for one computer and a few peripheral devices (printer, monitor, speakers, etc.).

FIG. 1 shows the interior layout of the CCUPAD. The first system is the power system. Power is supplied to the CCUPAD 1 by an extendable cord 2, which is held in a spring reel mechanism 3 so that the cord is retractable. As discussed above, power is divided into managed power and unmanaged power. The unmanaged power feeds into a surge suppressor device 4. From there, the unmanaged power is distributed to external power ports 5. Note that for the small CCUPAD, two such ports are shown. For the larger CCUPAD, additional power ports are supplied.

The managed power circuit first passes through a battery back-up system 6. This battery back up is designed to keep the equipment supplied by the CCUPAD energized in case of a power outage for a period of time. Power then moves to a second surge suppressor device 7. From there, power is distributed to the arms of the CCUPAD as discussed below.

In addition to the power circuits, network capabilities are also provided. This includes Internet as well as regular network systems that may be used. The network connection is fed by a retractable cable 10, which is fitted to a reel mechanism 11. This is connected to an external network port 12, which in turn, feeds a network switch 13. The network switch supplies network cables to the arms, as discussed below, as well as two external ports 14 as shown (as noted above, for the large CCUPAD, additional external network ports are supplied as well.)

The key to the CCUPAD is the arms. These arms supply the computer and peripherals that are needed by the user. The small CCUPAD has three arms, while the large CCUPAD has more. The large CCUPAD is discussed below. The arms are designed to be stored inside the CCUPAD box when not in use. They are deployed through holes in the side of the box as discussed below. The primary arm is called the "main artery" 15 it feeds the computer. There is a second arm called the "desktop arm" and a third arm called the "sound arm".

The desktop box 20 (which is also discussed in detail below) has at least one power outlet 21 (from the managed power source), at least one network port 22 that connects to the network switch 13, a USB port 23 that is connected through the main artery to the computer, and a video port for connecting to a monitor. This port is also connected to the computer through the main artery.

The sound arm 17 has a power source 25 that connects to the managed power source, and at least one sound cable 26 (used for remote speakers, for example) that runs back to the computer through the main artery.

In this way, the main computer tower can be placed under a desk, for example, and quickly connected to the cabled from the main artery. The monitor and other peripherals can be attached to the desktop box and sound arm, as desired. The CCUPAD can then be connected to power and the network using the connection cords, discussed above and the system is ready to use.

Figure 2:
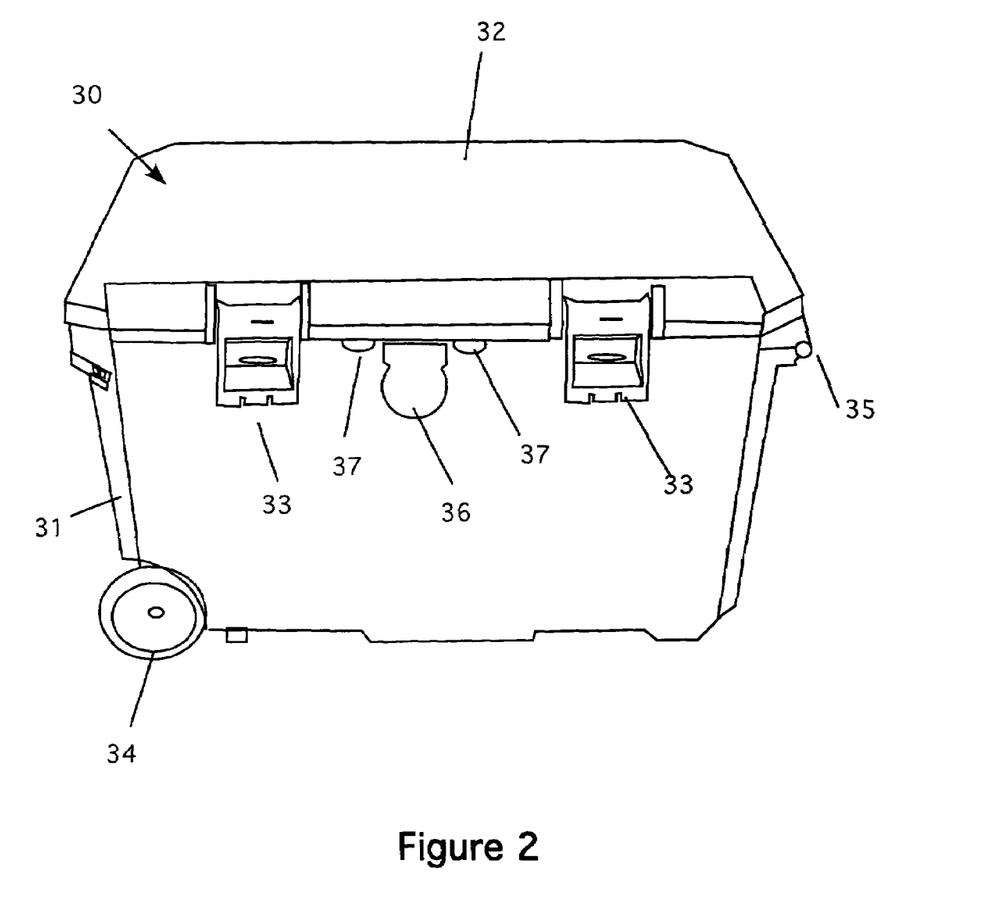
FIG. 2 is a front perspective view of a large CCUPAD closed for transport.

FIG. 2 is a front perspective view of a large CCUPAD 30 closed for transport. The large CCUPAD is a portable storage box 31 that has a lid 32 that is secured by latches 33. A pair of wheels 34 allows the unit to be rolled conveniently from place to place. A handle 35 is extendable to make pulling the unit easier. As shown, the unit has the arms stored within it. This is the normal mode for transport of the unit. A large opening 36 is provided to hold the main artery 40 and the desktop box system 41. Two smaller openings 37 are used to pass the sound arms 42 through the box for use.

Figure 3:
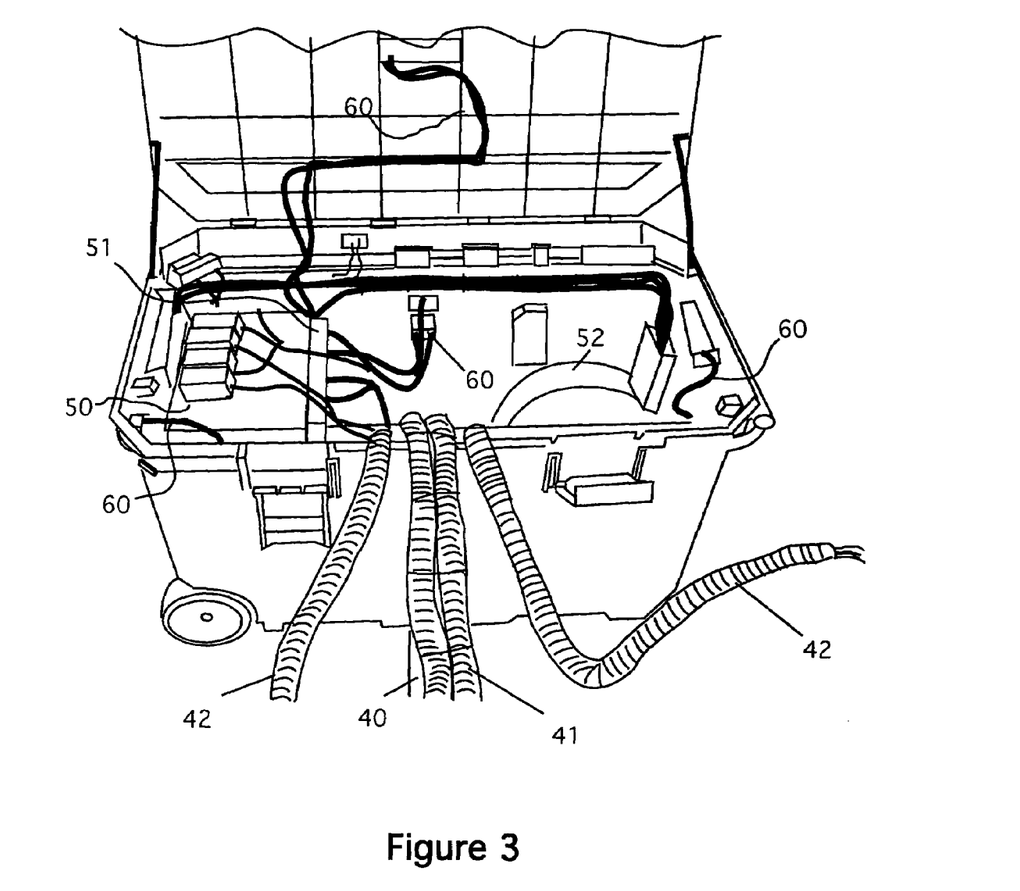
FIG. 3 is a front perspective view of a large CCUPAD open, with the arms deployed.

FIG. 3 is a front perspective view of a large CCUPAD open, with the arms deployed. Here, the box 31 is shown open. The sound arms 42 the desktop box system 41 and the main artery 40 are shown extending put of the box. Note that all of the arms are flexible plastic tubing. This controls the cables and makes deployment of them easy and simple.

Inside the box are the elements of the CCUPAD. On the far left, are the batteries 50 and surge protectors 51. Note the cables deployed to the various external ports around the perimeter of the device. Note also the power cord reel 52, located in the bottom rear of the device.

FIG. 3 also shows a number of cables 60 that run to power and communications circuits located in the perimeter of the box (as discussed below). These circuits provide power and network feeds to other CCUPADs in a given location. The extra ports are located as shown for convenience. Of course, these configurations can be changed easily, as desired or as needed.

Figure 4:
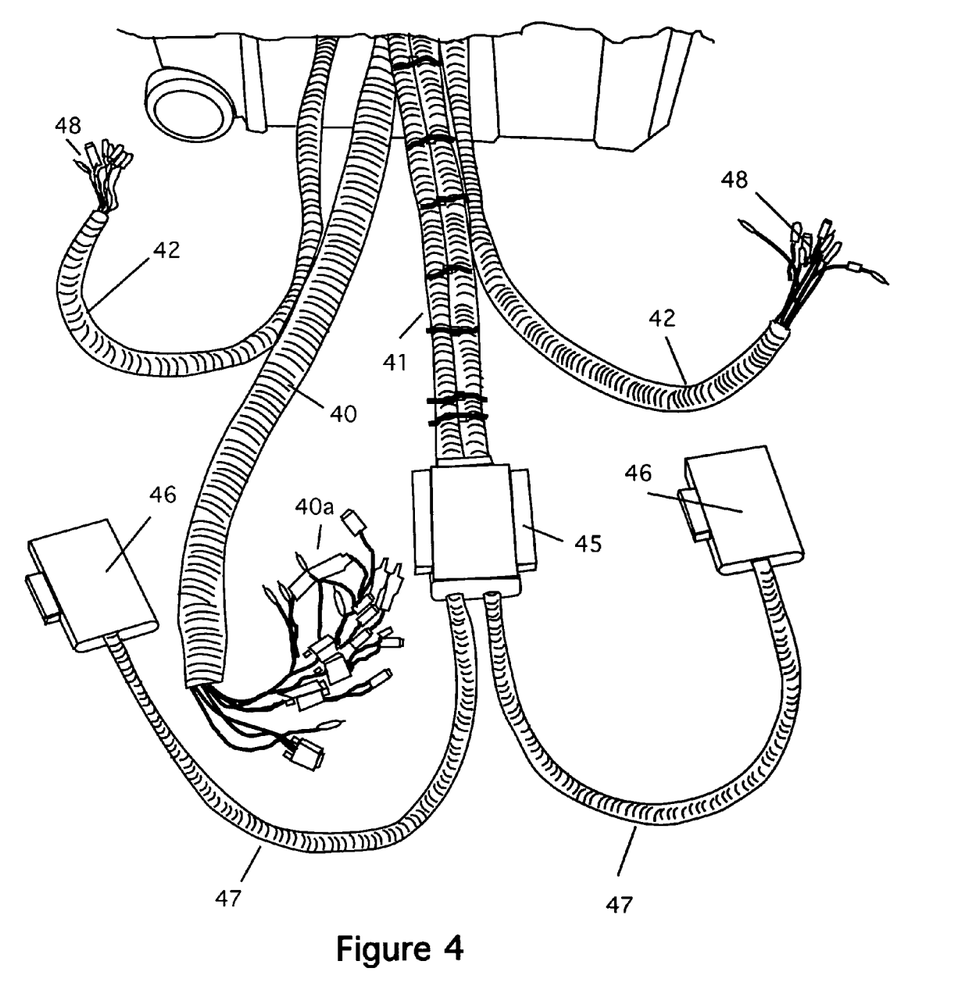
FIG. 4 is a detail view of the large CCUPAD's arms when removed from the box portion.

FIG. 4 is a detail view of the large CCUPAD's arms when removed from the box portion. Here, the ends of the various arms are shown. The main artery 40 is shown extending out. As mentioned above, it contains cables 40a that provide power, network connections, video, USB and sound. The number of cables varies and is typically more than is needed to ensure that the proper cables are found. This is due to the variety in power cable connections from computer to computer, for example. All cables are labeled so that ensuring continuity is simple. Any cables that are no used are simply left unconnected behind the computer, out of the way.

As in the case of the smaller CCUPAD, a desk arm 41 is provided. Here, however, the desk arm is expanded. There is a central distribution box 45 that multiple power and video outputs, as well as multiple USB ports. The central distribution box 45s designed to service up to six monitors simultaneously. Of course, few monitors may be fed as well. In addition to the central distribution box 45, the desk arm also has two side boxes 46 that are supplied using conduits 47. These side boxes 46 are similar to the small CCUPAD desk arm in that they provide power, network and USB ports. They do not video ports, however. Two side arms are provided to provide symmetry for the system. In this way, devices can be placed conveniently on a desk without concern of how to connect them to the computer.

The large CCUPAD also has two sound arms 42. Each of these arms contains power and a variety of sound cables 48. In this way, any type of modern sound equipment can be connected to the computer. The two arms not only provide symmetry, they also eliminate the need to string cables from one speaker on one side of the desk to a second speaker placed on the other side of the desk. These connections can be made neatly using the sound arms.

The use of the arms and boxes eliminates the need for point-to-point connections. There is no longer a need to run five, six or more power cords independently to a central power strip. There is also no need to run dozens of other cables from devices directly back to the computer.

Figure 5:
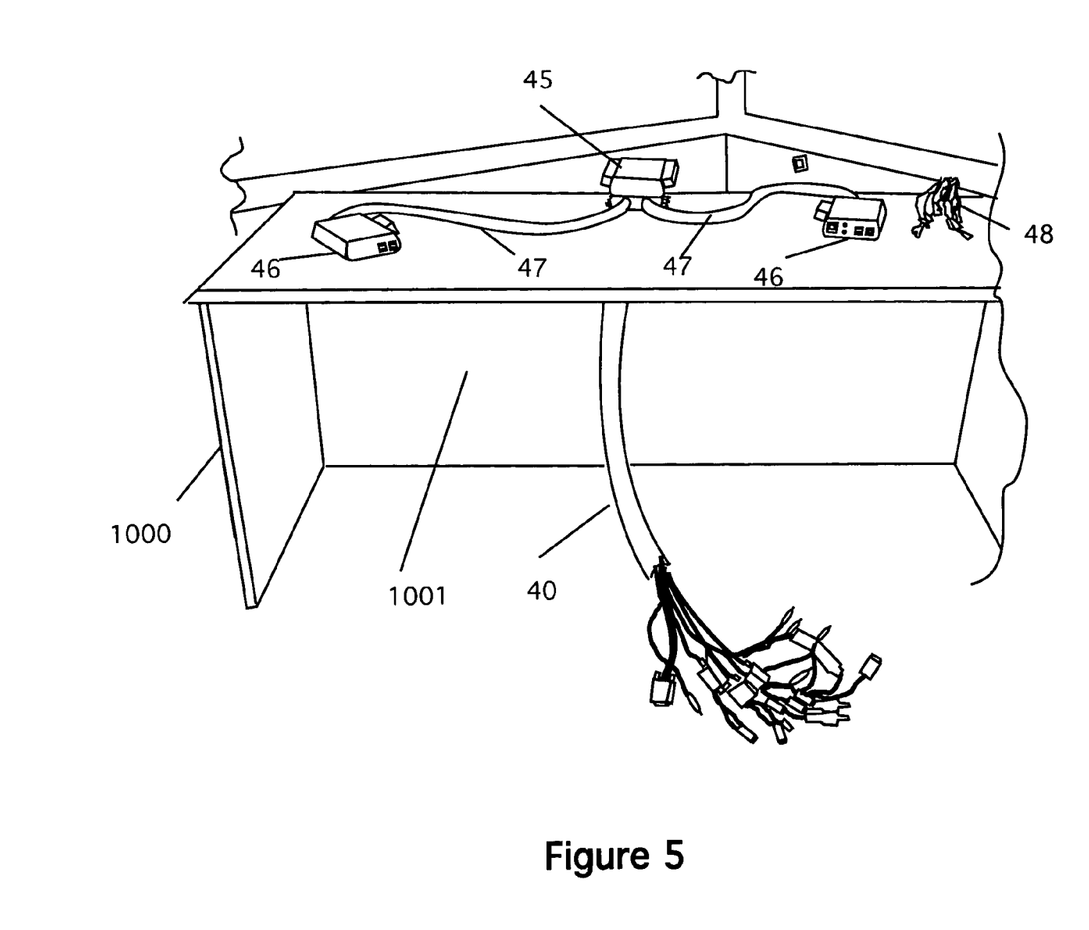
FIG. 5 is a front perspective view of a desk having the large CCUPAD stored behind it and the arms deployed in a working deployment.

FIG. 5 is a front perspective view of a desk having the large CCUPAD stored behind it and the arms deployed in a working deployment. Here, the large box 30 is positioned behind a desk 1000. The main artery 40 is run through the back panel 1001 of the desk. Here, it is positioned to connect to a computer tower (not shown) placed under the desk. The central distribution box, two side boxes 46 and conduits 47 are shown deployed on the desk. Note how the boxes are positioned to service equipment placed anywhere on the desk. Sound cables 48 from one of the sound arms are shown on the far right.

It is clear from this figure that the CCUPAD provides complete computer cabling in a neat and efficient manner that makes hooking-up a computer and its various peripherals fast and easy.

Figure 6:
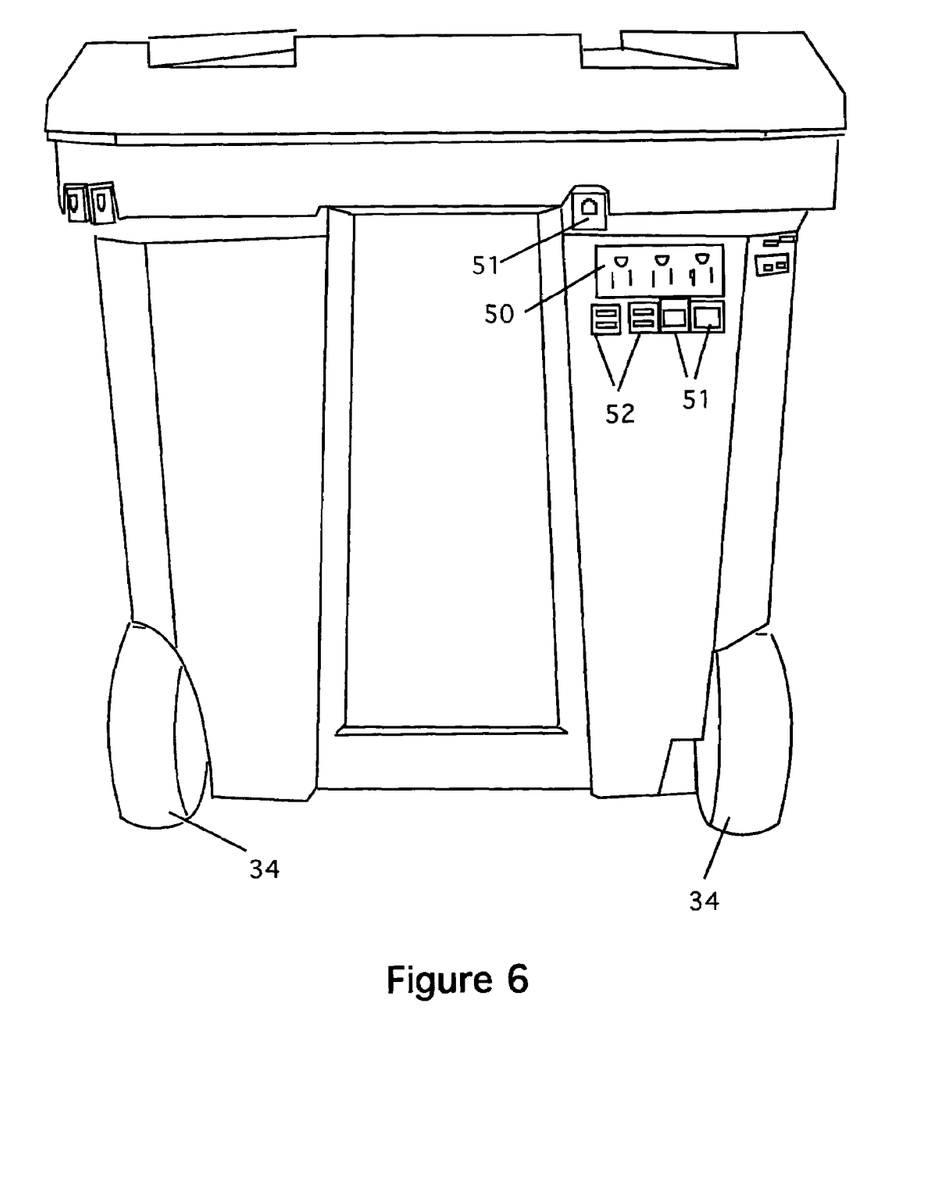
FIG. 6 is a left side view of a large CCUPAD.

FIG. 6 is a left side view of a large CCUPAD. Here, the wheels are shown. Also shown are external ports for power 61 and network 62 as well as for USB 63 are shown. The ports are positioned around the box so that connections can be taken off in any direction. In this way, many CCUPADS can be serviced from one large CCUPAD.

Figure 7:
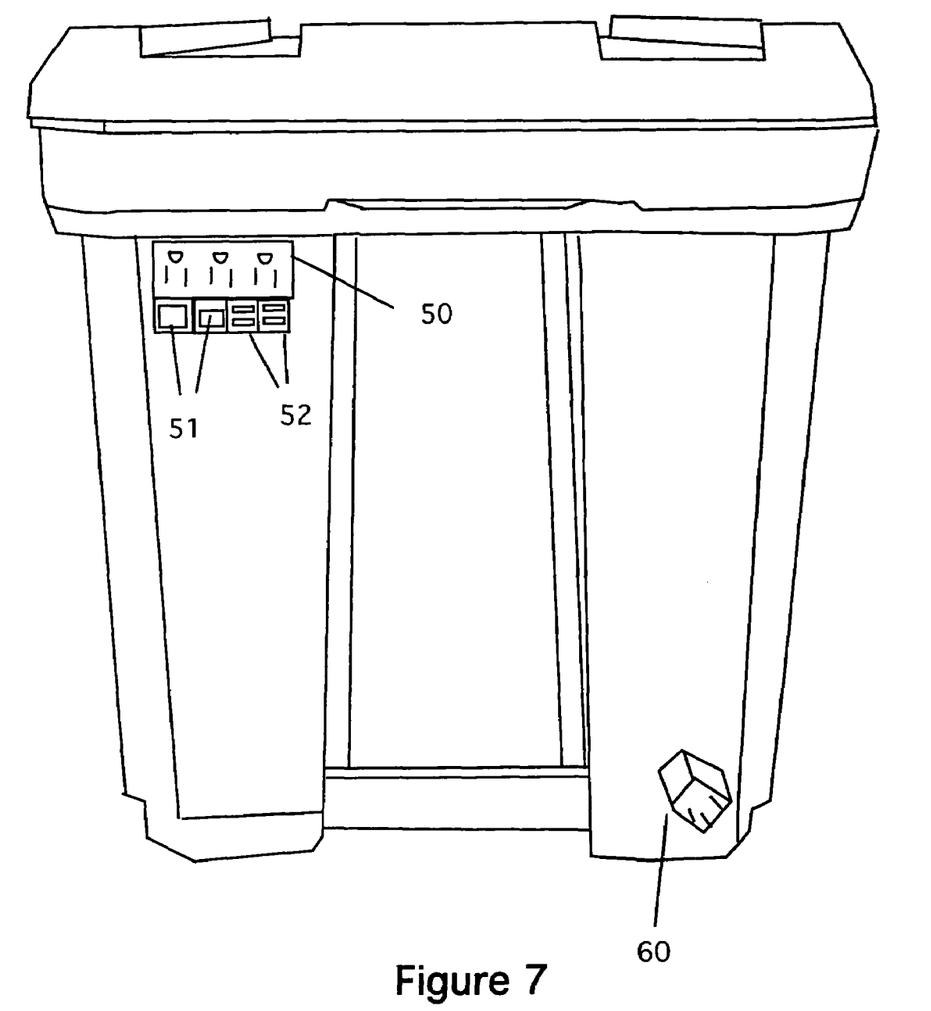
FIG. 7 is a right side view of a large CCUPAD.

FIG. 7 is a right side view of a large CCUPAD. Here, the power plug 70 is shown fully retracted. Ports for power 61 and network 62 as well as for USB 63 are shown here.

Figure 8:
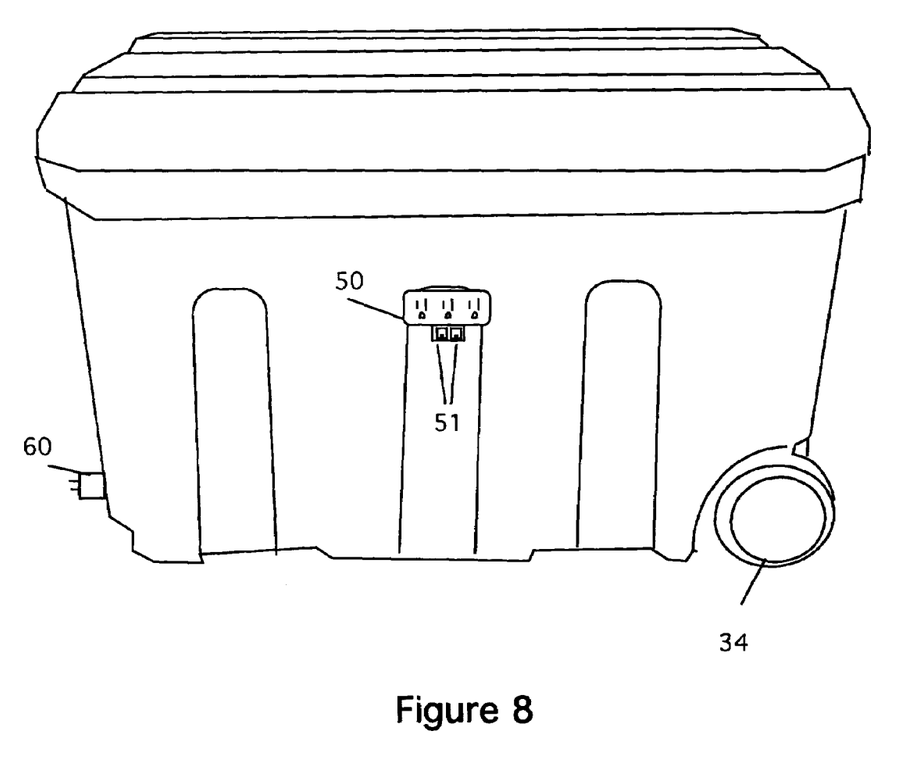
FIG. 8 is a rear perspective view of a large CCUPAD.

FIG. 8 is a rear perspective view of a large CCUPAD. As before, ports for power 61 and network 62 are shown on this side as well.

The power for these external outlets comes from the unmanaged power supply. This is because these outlets are intended to be used to feed other CCUPADs. Since each CCUPAD has an internal managed power supply, managed power is not needed to supply them. The communications ports supply network availability as well. In this way, one large CCUPAD can supply a room full of CCUPADs, such as in a trade show or to supply a new office. Either can be done quickly and easily using the CCUPAD system.

The wiring diagrams and the layout of the equipment can be changed according to preferences. The essential elements are the managed power circuits, the main artery and the desktop arm. The number and location of the external ports can be changed as desired. Of course, for the greatest versatility, several ports, accessible from any side of the unit are preferred.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A self-contained power and signal distribution system for computers comprising:
   a) a storage box, having an inside and an outside;
   b) a means for connecting to an electric power supply, installed within said storage box;
   c) a means for conditioning a supply of electric power, installed within said storage box;
   d) a main artery conduit, extending from said storage box, wherein said main artery conduit contains a plurality of cables for connecting to a computer;
   e) a desk arm conduit, extending from said storage box, said desk arm conduit having a distal end; and
   f) a desktop box, secured to the distal end of said desk arm conduit, said desk top box having at least one power outlet, at least one network port, a USB port, and a video port attached thereto.

2. The self-contained power and signal distribution system for computers of claim 1 further comprising: a sound conduit, extending from said storage box, said sound conduit containing a power cord and at least one sound cable.

3. The self-contained power and signal distribution system for computers of claim 1 wherein the means for connecting to an electric power supply includes a retractable power cord.

4. The self-contained power and signal distribution system for computers of claim 1 wherein the means for conditioning a supply of electric power includes at least on surge protector.

5. The self-contained power and signal distribution system for computers of claim 1 wherein the means for conditioning a supply of electric power includes at least one battery; and a means for converting direct current power from said battery to an alternating current voltage.

6. The self-contained power and signal distribution system for computers of claim 1 wherein the means for connecting to a power supply provides an electric power source inside said box; and further wherein the electric power source inside said box is divided into an unmanaged portion and a managed portion.

7. The self-contained power and signal distribution system for computers of claim 1 wherein said storage box has a plurality of power outlets attached to the outside of said storage box.

8. The self-contained power and signal distribution system for computers of claim 7 wherein the plurality of power outlets attached to the outside of said storage box are supplied from the unmanaged portion of said electric power source.

9. The self-contained power and signal distribution system for computers of claim 1 further comprising:
   a) a network signal system, installed within said storage box; and
   b) a means for connecting the network signal system, installed within said storage box to an external communications network.

10. The self-contained power and signal distribution system for computers of claim 9 wherein the external communications network is a broadband, high-speed network.

11. The self-contained power and signal distribution system for computers of claim 1 wherein the storage box is portable.

12. The self-contained power and signal distribution system for computers of claim 1 wherein the main artery conduit, desk arm conduit and said desktop box are stored within said storage box for transport.

13. A self-contained power and signal distribution system for computers comprising:
   a) a storage box;
   b) a means for connecting to an electric power supply, installed within said storage box;
   c) a means for conditioning a supply of electric power, installed within said storage box;
   d) a main artery conduit, extending from said storage box, wherein said main artery conduit contains a plurality of cables for connecting to a computer;
   e) a main desk conduit, extending from said storage box, said desk arm conduit having a distal end;
   f) a center desktop box, secured to the distal end of said desk arm conduit, said desk top box having at least one power outlet, at least one network port, a USB port, and a video port attached thereto;
   g) at least one side desk conduit, having a distal end, said side desk conduit having a plurality of cables, being in electrical communication with said center desktop box; and
   h) a side desktop box, secured to the distal end of said side desk conduit, said side desk top box having at least one power outlet, at least one network port, a USB port, and a video port attached thereto.

14. The self-contained power and signal distribution system for computers of claim 13 further comprising:
   a) a network signal system, installed within said storage box; and b) a means for connecting the network signal system, installed within said storage box to an external communications network.

15. The self-contained power and signal distribution system for computers of claim 13 further comprising: a sound conduit, extending from said storage box, said sound conduit containing a power cord and at least one sound cable.

16. The self-contained power and signal distribution system for computers of claim 13 wherein the means for connecting to an electric power supply includes a retractable power cord.

17. The self-contained power and signal distribution system for computers of claim 13 wherein the means for conditioning a supply of electric power includes at least on surge protector.

18. The self-contained power and signal distribution system for computers of claim 13 wherein the means for conditioning a supply of electric power includes at least one battery; and a means for converting direct current power from said battery to an alternating current voltage.

19. The self-contained power and signal distribution system for computers of claim 13 wherein the means for connecting to a power supply provides an electric power source inside said box; and further wherein the electric power source inside said box is divided into an unmanaged portion and a managed portion.

20. The self-contained power and signal distribution system for computers of claim 13 wherein said storage box has a plurality of power outlets attached to the outside of said storage box.

21. The self-contained power and signal distribution system for computers of claim 20 wherein the plurality of power outlets attached to the outside of said storage box are supplied from the unmanaged portion of said electric power source.

22. The self-contained power and signal distribution system for computers of claim 13 wherein the external communications network is a broadband, high-speed network.

23. The self-contained power and signal distribution system for computers of claim 13 wherein the storage box is portable.

24. The self-contained power and signal distribution system for computers of claim 13 wherein the main artery conduit, center arm conduit, said center desktop box, said side desktop conduit, and said side desktop box are stored within said storage box for transport.

25. The self-contained power and signal distribution system for computers of claim 13 further comprising:
  a) a second side desk conduit, having a distal end, said side desk conduit having a plurality of cables, being in electrical communication with said center desktop box; and
  b) a second side desktop box, secured to the distal end of said second side desk conduit, said second side desk top box having at least one power outlet, at least one network port, a USB port, and a video port attached thereto.

\* \* \* \* \*